United States Patent [19]

Bram

[11] 3,844,589

[45] Oct. 29, 1974

[54] LOCKING DEVICE FOR PIPE ELEMENTS

[75] Inventor: Georges Eugene Bram, Pont-A-Mousson, France

[73] Assignee: Pont-A-Mousson S.A., Nancy, France

[22] Filed: Sept. 25, 1972

[21] Appl. No.: 292,225

[30] Foreign Application Priority Data
Oct. 12, 1971  France..........................71.36562

[52] U.S. Cl................. 285/184, 285/231, 285/365, 285/416
[51] Int. Cl............................................ F16l 27/00
[58] Field of Search ........... 285/184, 231, 223, 365, 285/364, 337, 374, 367, 416; 403/73, 75, 104

[56]  References Cited
UNITED STATES PATENTS

| | | | |
|---|---|---|---|
| 407,681 | 7/1889 | Potts................................... | 285/184 |
| 776,971 | 12/1904 | Walsh................................. | 285/184 |
| 3,367,108 | 2/1968 | Camboulives.................. | 285/223 X |
| 3,632,144 | 1/1972 | Shire et al........................... | 285/231 |

FOREIGN PATENTS OR APPLICATIONS

| | | | |
|---|---|---|---|
| 851,062 | 9/1970 | Canada............................... | 285/231 |
| 58,174 | 4/1863 | France................................ | 285/365 |
| 379,659 | 9/1932 | Great Britain...................... | 285/231 |

*Primary Examiner*—Thomas F. Callaghan
*Attorney, Agent, or Firm*—Sughrue, Rothwell, Mion, Zinn & Macpeak

[57]  ABSTRACT

Device for locking a joint between two pipe elements which may have an angular deviation between their axes, of the type in which a first abutment projection on one of the pipe elements is axially supported by an inner shoulder of a hollow member of revolution which surrounds the region of the joint and axially supports a second abutment projection on the other pipe element. The feature of the device is that an annular spacer means is axially interposed between and engages the inner shoulder of the member of revolution and the first abutment projection, the spacer means having an axial thickness which is adjustable along the periphery of the spacer means in accordance with the angular deviation between the axes of the pipe elements.

6 Claims, 12 Drawing Figures

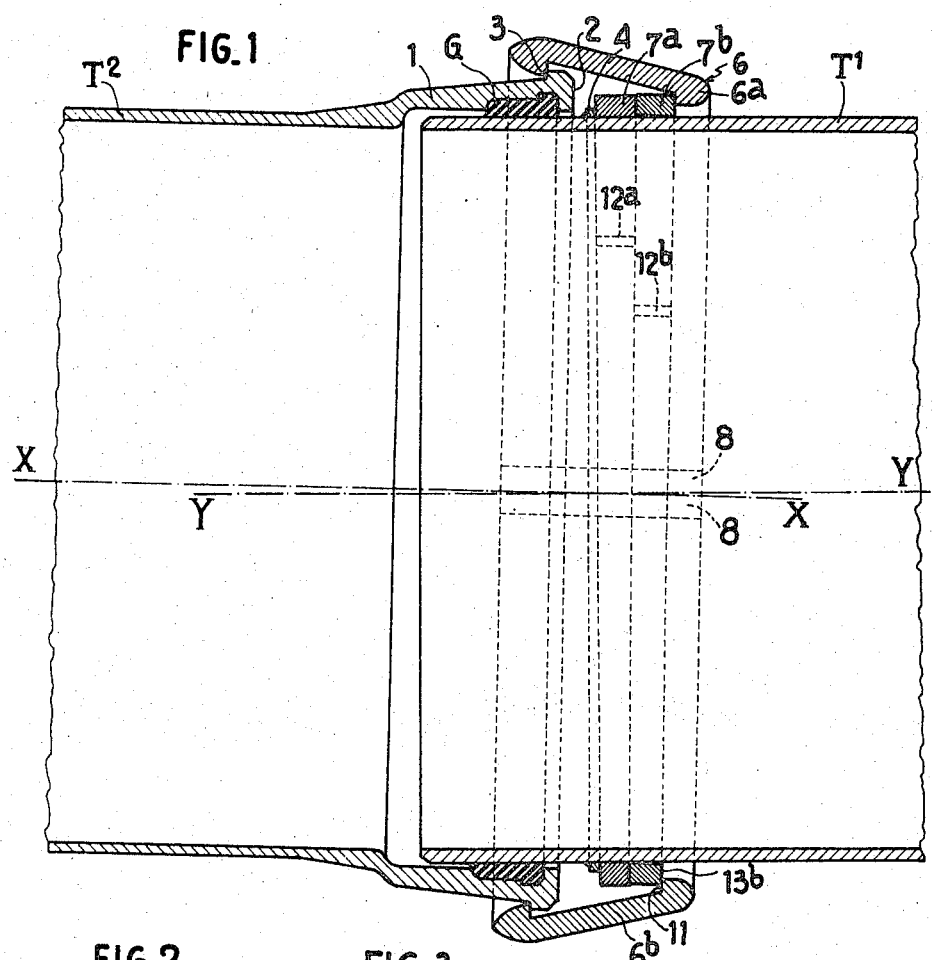
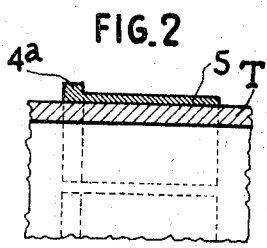
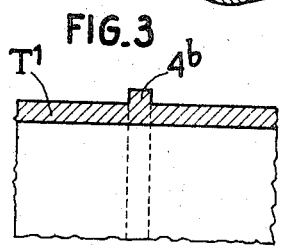
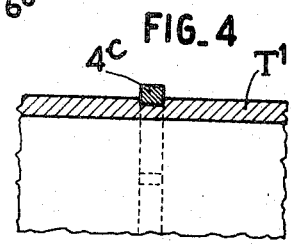
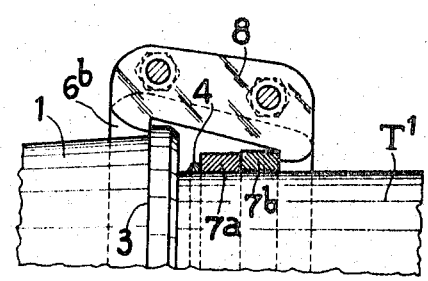

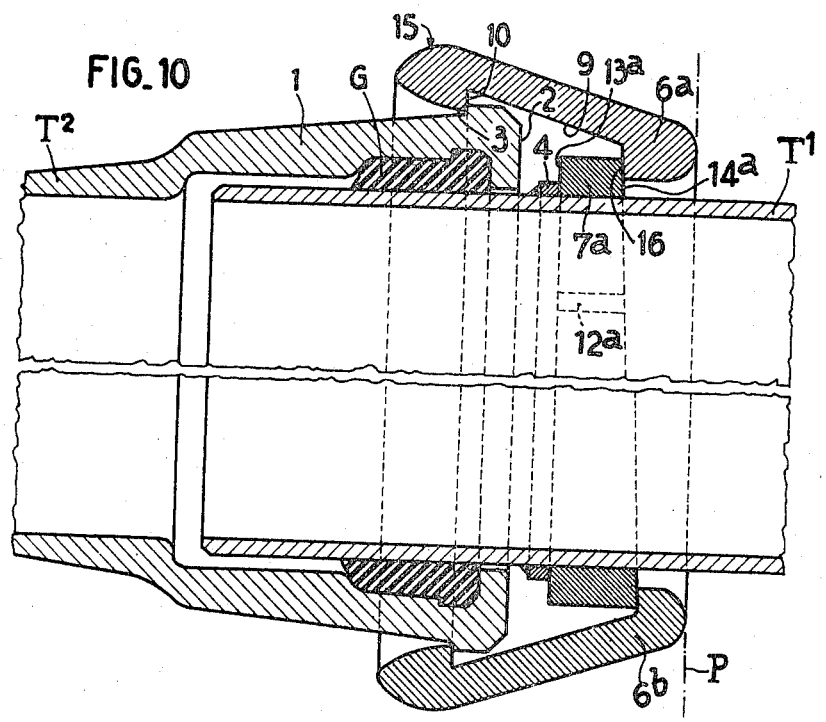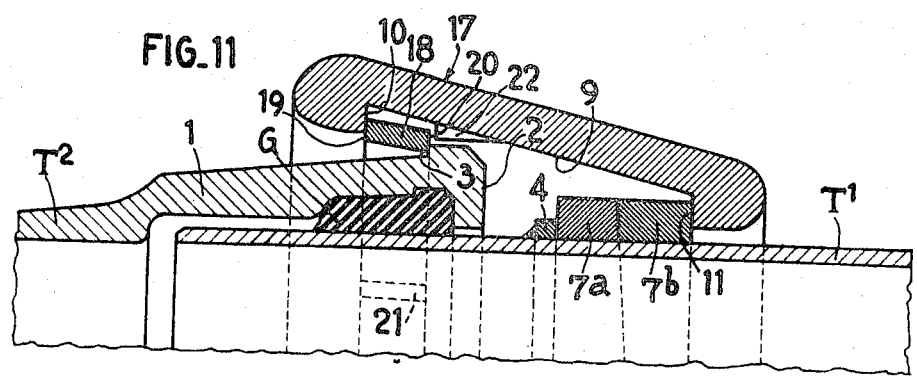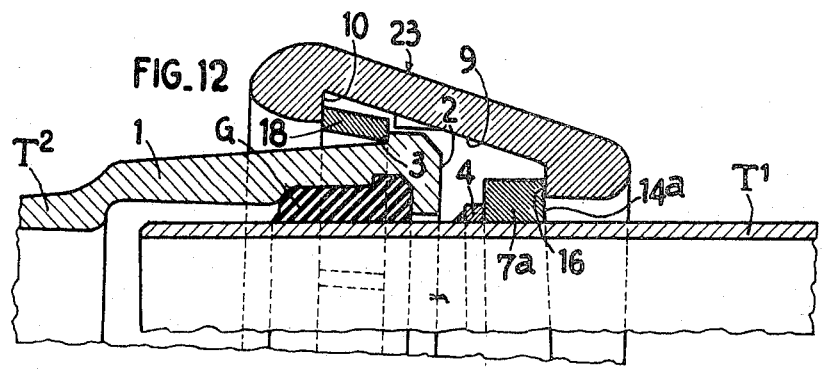

LOCKING DEVICE FOR PIPE ELEMENTS

The present invention relates to a locking device for pipe elements and in particular pipe elements of large diameter.

In piping under pressure the forces resulting from the thrust of the fluid conveyed in the piping may be extremely high. They are in the neibourhood of 900 metric tons in the case of a 1,600 mm pipe sujected to an internal pressure of 40 bars. The thrusts are exerted at each end of the pipe, at each change of direction or diameter and at each branch connection.

Now, the function of couplings conventionally employed is to ensure the seal between the different elements of the piping but not to oppose the thrusts due to the pressure of the fluid. This is why the aforementioned points of the piping are provided whenever possible with supports in the form of concrete masses which are so calculated and designed that they resist by means of their own weight or by means of the support they have on the walls of the excavation or trench if the ground is sufficiently strong.

However, the construction of such a mass may be impossible or too expensive. It is then necessary to use couplings or joints of the so-called locked type in which parts, which are integral with the two pipe elements to be coupled, prevent separation of these elements.

The choice of members of revolution for this interconnection permits avoiding, when the thrust is high, the use of excessively large parts at only a few points of the periphery.

However, these members of revolution must have an effective support throughout the periphery of the pipe. Now, this condition is no longer respected when there is an angular deviation between the two successive pipe elements.

An object of the present invention is to provide a locking device which employs a member of revolution but in which said member is afforded an effective support on the whole of the periphery of the pipe in the case of an angular deviation between the pipe elements.

The invention provides a device for locking a joint between two pipe elements which may have an angular deviation between their axes and of the type in which a first abutment projection integral with the outer surface of a first of said pipe elements is supported by an inner shoulder of a hollow member of revolution which surrounds the region of the joint and is supported by a second abutment projection integral with the outer surface of the second pipe element, wherein annular spacer means whose thickness is adjustable so as to be capable of varying along the periphery in accordance with the angular deviation between the two pipe elements are interposed between the first abutment projection and the inner shoulder of the hollow member of revolution.

Further features and advantages of the invention will be apparent from the ensuing description with reference to the accompanying drawings.

In the drawings:

FIG. 1 is a longitudinal diametral sectional view of the joint or coupling between two pipe elements having respectively a smooth male end and a socket end and interlocked by means of the device according to the invention, the two pipe elements having a certain angular deviation;

FIGS. 2, 3 and 4 are partial longitudinal diametral sectional views of three modifications of the pipe according to the invention concerning the abutment projection of the smooth male end;

FIG. 5 is a partial plan view of the structure shown in FIG. 1 the top half of the hollow member of revolution being omitted;

Figure 6:
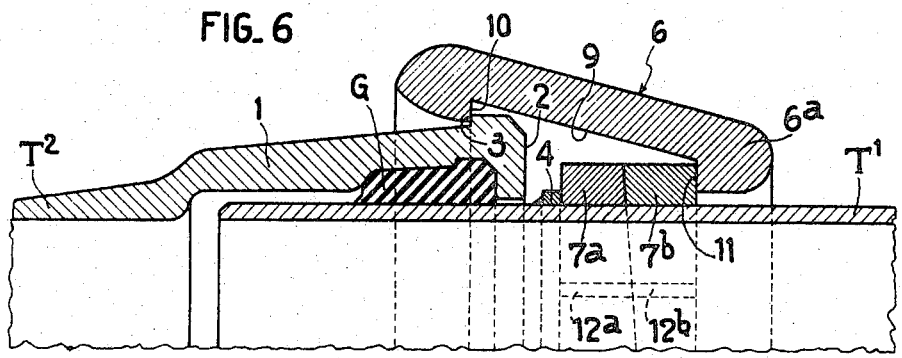
FIG. 6 is a view similar to FIG. 1 but partial and to an enlarged scale, the two pipe elements being in coaxial alignment.
Figure 7:
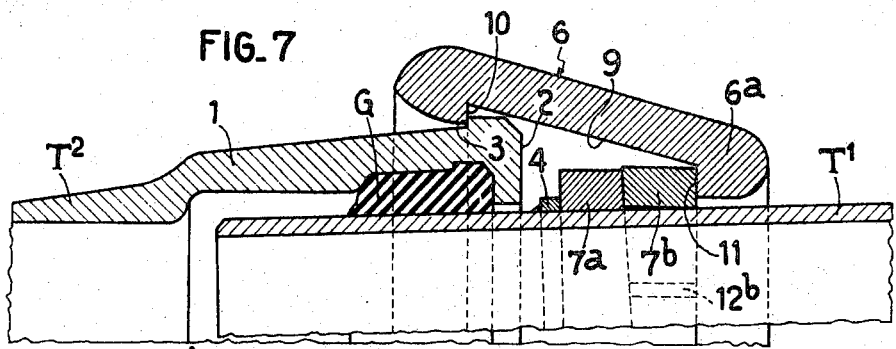
FIG. 7 is a view similar to FIG. 6, the two pipe elements being in the position shown in FIG. 1.
Figure 8:
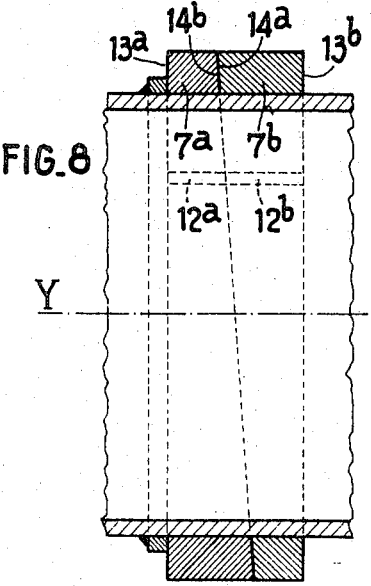
Figure 9:
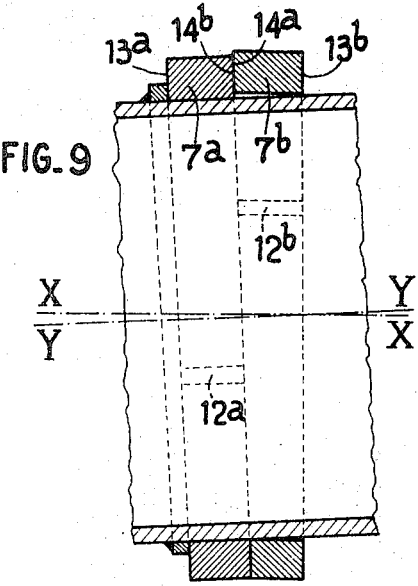

FIGS. 8 and 9 are diagrammatic views corresponding to those of FIGS. 6 and 7 but complete and having proportions of exaggerated size so as to make it quite clear how the position of the rings of the locking device is adjusted, and FIGS. 10, 11 and 12 are views similar to FIG. 6 in respect of three modifications of the device according to the invention, FIG. 10 showing the device with a part cut away and the remaining parts moved toward each other so as to stress the inclination of the inner shoulder of the hollow member of revolution.

The joint or coupling shown in FIGS. 1–6 is between two tubular pipe elements $T^1$ and $T^2$, the first element having a smooth male end and the second element having a socket 1. The seal is achieved by means of a radially-compressed sealing member G which is disposed in the socket 1 and whose interior profile is of known shape. The two pipe elements are of spheroidal graphite cast iron.

The socket has on its periphery in the vicinity of its end edge 2 and parallel to the latter and therefore perpendicular to the axis of the element $T^2$, an annular shoulder 3 adapted to constitute an abutment projection.

The male end of element $T^1$ carries an annular abutment projection 4 having a square section the sides of which are very small relative to the diameter of the pipe elements and rather of the order of the thickness of the wall of these elements.

This abutment projection is disposed near the end of the male element $T^1$ but at a distance therefrom which is such that it does not come into contact with the edge 2 of the pipe element $T^2$ when the joint is in the final position after the sealing element G has been placed in position. This projection is of steel and mounted on the element $T^1$ in the factory in a plane perpendicular to the axis Y—Y and secured to the element $T^1$ by a weld bead. The annular projection 4 has a split which facilitates its assembly with the pipe element.

By way of a modification, the abutment projection 4 can have a section such as that shown in FIG. 2 which shows a portion 4a of square section integral with the end of a sleeve 5 of rectangular section, the thickness of the sleeve being small relative to the side of the abutment projection and the length, measured along the axis $T^1$, being several times said side of the projection. This abutment projection is also split to facilitate assembly and mounted on the pipe element $T^1$ in the factory and fixed by adhesion.

In two other modifications, an abutment projection 4b is in one piece with the pipe element $T^1$ (FIG. 3) and another abutment projection 4c, similar to the projection 4, is anchored in a recess formed on the outside of the pipe element $T^1$ (FIG. 4). It could also have any section provided that one side of this section is parallel to the axis of element $T^1$ and another side, remote from the free end of element $T^1$, is perpendicular to this axis.

The locking of the two pipe elements $T^1$ and $T^2$ prepared in the manner indicated hereinbefore is achieved by means of a member of revolution 6 and two rings 7a and 7b.

The member 6 is a generally frustoconical annular collar of spheroidal graphite cast iron and comprises two identical segments or sectors 6a and 6b which are divided from each other in a meridian plane and held assembled by means of ears 8 of known type. Its wall is very thick relative to the thickness of the elements $T^1$ and $T^2$ and it has an annular inner recess 9 the ends of which are defined by inner shoulders 10 and 11 which are parallel and located in planes perpendicular to its axis of revolution. Its smaller end is adjacent the male element $T^1$ and the shoulder 10 of the larger end overlaps the socket 1 and engages behind the shoulder 3. This locking collar can be divided into a larger number of identical segments so as to facilitate manufacture. In the case of two segments, each one must not subtend an angle at the centre of more than 180°.

The rings 7a and 7b are relatively resilient steel rings and each one is split along a split 12a or 12b parallel to its axis of revolution and throughout its length. Each of these rings is a hollow cylinder having a thick, short wall, the height being of the same order of magnitude as its thickness which is itself of the order of magnitude of the thickness of the collar 6. The ring 12a or 12b has an end face 13a or 13b contained in a plane perpendicular to its axis of revolution and an opposite end face 14a or 14b which is oblique relative to said plane. The dihedral angle made by the two faces of each ring is equal to one half of the permissible maximum angular deviation between the pipe elements $T^1$ and $T^2$. The inside diameter of the rings is roughly equal to the outside diameter of the pipe element $T^1$. As concerns the collar 6, the inside diameter of the shoulder 10 is of course such that the latter is capable of hooking behind the shoulder 3 of the socket 1 and the diameter of its shoulder 11 is such that it is capable of hooking behind the ring 7b adjacent thereto.

Indeed, the joint or coupling is locked in the following manner:

The parts 6, 7a and 7b are independent of the two pipe elements $T^1$ and $T^2$ to be interconnected and are transported, apart, from the factory to the pipe-laying site and engaged on the pipe elements $T^1$ and $T^2$ only at the moment of assembly.

The first stage of this assembly comprises passing over the smooth male end of the pipe element $T^1$ the two rings 7a and 7b, disposed with their sloping faces 14a and 14b facing each other, by causing the rings to pass-owing to their splits 12a and 12b and resilience-over the abutment projection 4. After having assembled the joint by mounting the sealing element G and introducing the male end into the socket, a differential measurement of the distance between the projection 4 and the end face 2 of the socket permits determining the value and the direction of the angular deviation between the pipe elements $T^1$ and $T^2$. By rotating the two rings 7a and 7b with respect to each other and by rotating their assembly around the male end of the element $T^1$, there is re-established the perpendicularity of the face 13b (adapted to be supported by the shoulder 11 of the collar 6) of the ring 7b relative to the axis X—X of the element $T^2$ and therefore the parallelism of this face 13b with the shoulder 3. Further, in this way the space between the abutment projection 4 carried by the element $T^1$ and the shoulder 11 of the locking collar 6 is filled. The locking collar is hooked onto the socket by the anchoring of its shoulder 10 behind the shoulder 3. Indeed, the whole of the joint is overlapped or covered by the locking collar by placing in position its segments and interconnecting them by means of the ears 8.

FIG. 10 shows a modification in which the ring 7b is omitted and the locking collar 15 is on the whole similar to that shown in FIGS. 1–9 but shorter and has instead of the shoulder 11 a shoulder 16 contained in a plane which is inclined relative to the axis of revolution at an angle equal to that of the plane containing the face 14b of the ring 7b. Thus, the sloping face 14a of the shoulder 16 can engage the ring 7a so that it is always possible to obtain for the shoulder 10, adapted to engage the shoulder 13 on the socket, an orientation which is perpendicular to the axis X—X of the element $T^2$.

Under these conditions, it is still possible to make the locking collar 15 in a plurality of segments, but instead of these being identical as in the embodiment shown in FIGS. 1–6, these segments have a recess 9 having a shoulder 16 which is inclined to the plane P tangent to the end of the collar. The dihedral angle made by the planes 16 and P remains constant but the mean distance between the two planes varies from one segment to the other.

In the two embodiments just described, the frustoconical collar 6 or 15 is in two or more segments. For various reasons it may be desirable to construct a collar in one piece. The two modifications shown in FIGS. 11 and 12 are of this design.

As shown in FIG. 11, the locking device (abutment projection 4, rings 7a and 7b and collar) is on the whole identical to that shown in FIGS. 1–9 except that the locking collar 17 is extended adjacent the element $T^2$ so that the bearing of the shoulder 3 of the socket against the shoulder 10 of the collar 17 is impossible without the provision of an interposed slightly frustoconical resiliently yieldable steel ring 18 having parallel faces 19 and 20 which is employed as an inverted circlip, that is to say, a circlip whose position of rest is that corresponding to the smaller diameter. Indeed, this ring, which has a split 21 parallel to its axis of revolution, has a tendency by construction to close and contract radially owing to the resilience of the metal of which it is made. During the positioning, the ring 18 is artificially maintained, by means of a wedge (not shown) disposed in its split, in a discontinuous groove defined in the recess 9 of the collar by the shoulder 10 of this collar and a series of projections 22 which are in one piece with and disposed inside the collar. The collar 17, thus provided with its expanded ring 18, is then mounted on the element $T^1$ before the rings 7a and 7b. The remainder of the assembly of the joint is then identical and the last stage of the locking consists, once all the other parts have been placed in position, in allowing the ring 18 to contract by withdrawing the wedge which had maintained the ring 18 open. The latter then takes up its final position by sliding against the shoulder 10 of the collar until its face 20 bears against the shoulder 3 of the socket. It will be clear that the inside diameter of the shoulder 10 and the diameter of the circle on which the projections 22 are arranged must be greater than the maximum diameter of the socket whereas the inside diameter of the shoulder 11 is always greater than the outside diameter of the abutment projection 4.

In the same way that the modification shown in FIG. 10 is derived from the embodiments shown in FIGS. 1–9, the modification shown in FIG. 12 is derived from the embodiment shown in FIG. 11, the second ring 7b being omitted and an inclined face of the shoulder 16 being formed on the collar 23 instead of the straight or perpendicular shoulder 11.

Having now described my invention what I claim as new and desire to secure by Letters Patent is:

1. A device for locking a joint between two pipe elements which may have an angular deviation between their axes, so as to preclude axial separation of the pipe elements throughout the periphery of the pipe elements while allowing the pipe elements to move toward each other, comprising means defining a first abutment projection integral with an outer surface of a first of said pipe elements, means defining a second abutment projection integral with an outer surface of a second of said pipe elements, means defining a member of revolution which surrounds the joint and comprises adjacent one end of the member an inner shoulder and at an opposite end of the member means for axially supporting the second abutment projection, and annular circumferentially substantially continuous spacer means mounted on said first pipe element and having an axial thickness which is adjustable along the periphery of the spacer means in accordance with the angular deviation between the two pipe elements and being axially interposed between and engaging the first abutment projection and the inner shoulder to be effective as a support precluding axial separation of the pipes in an even manner around the periphery of the abutment projection and the inner shoulder.

2. A device as claimed in claim 1, wherein one of the pipe elements has a male end and the other pipe element a socket, the male end being inserted in the socket, and the member of revolution has a generally frustoconical shape defining a large end portion surrounding the socket and the abutment projection of the pipe element having the socket is constituted by an outer shoulder on the socket.

3. A device as claimed in claim 2, wherein the member of revolution comprises two part-circular segments, each of which segments is defined by radial planes which subtend an angle at the centre of no more than 180°, and means for interconnecting the segments in regions adjacent said radial planes, the inner shoulder of the member of revolution which supports the shoulder of the socket bearing directly against said shoulder.

4. A device as claimed in claim 2, wherein the member of revolution is in one piece and the inner shoulder of the member and the means for axially supporting the second abutment projection define an inner recess in the member of revolution and the device further comprises a split ring having parallel plane end faces, the recess of the member of revolution having projections located at a distance from the inner shoulder equal to the axial dimension of the split ring.

5. A device for locking a joint between two pipe elements which may have an angular deviation between their axes, so as to preclude axial separation of the pipe elements throughout the periphery of the pipe elements while allowing the pipe elements to move toward each other, comprising means defining a first abutment projection integral with an outer surface of a first of said pipe elements, means defining a second abutment projection integral with an outer surface of a second of said pipe elements, means defining a member of revolution which surrounds the joint and comprises adjacent one end of the member a first inner shoulder and at an opposite end of the member a second inner shoulder, and annular circumferentially substantially continuous spacer means mounted on said first pipe element and comprising two split rings each of which rings has a first plane face normal to the axis of the ring and a second plane face inclined relative to the first face, the two second faces of the rings being in contact with each other whereby the axial thickness of said spacer means is adjustable along the periphery of the spacer means in accordance with the angular deviation between the pipe elements, the first inner shoulder being parallel to the second inner shoulder and perpendicular to the axis of the member, the second shoulder axially supporting the second abutment projection in an even manner around the periphery of the second pipe element and the first shoulder bearing axially against and supporting the first plane face of one of the two rings in an even manner around the periphery of the first pipe element and the first plane face of the other of the two rings bearing against and supporting the first abutment projection in an even manner around the periphery of the first pipe element.

6. A device for locking a joint between two pipe elements which may have an angular deviation between their axes, so as to preclude axial separation of the pipe elements throughout the periphery of the pipe elements while allowing the pipe elements to move toward each other, comprising means defining a first abutment projection integral with an outer surface of a first of said pipe elements, means defining a second abutment projection integral with an outer surface of a second of said pipe elements, means defining a member of revolution which surrounds the joint and comprises adjacent one end of the member a first inner shoulder and at an opposite end of the member a second inner shoulder and annular circumferentially substantially continuous spacer means comprising a split ring which is mounted on said first pipe element and has a first plane face perpendicular to the axis of the ring and a second plane face which is inclined relative to the first face, the first shoulder being perpendicular to the axis of the member and the second shoulder being inclined relative to the first shoulder, the first shoulder axially supporting the second abutment projection in an even manner around the periphery of the second pipe element and the second shoulder bearing behind and supporting the second face of the ring in an even manner around the periphery of the first pipe element and the first face of the ring bearing axially against the first abutment projection in an even manner around the periphery of the first pipe element whereby the axial thickness of said spacer means is adjustable along the periphery of the spacer means in accordance with the angular deviation between the pipe elements.

* * * * *